Aug. 3, 1926.
J. J. ANDERSON
1,594,808
ENGINE TESTER
Filed March 25, 1925
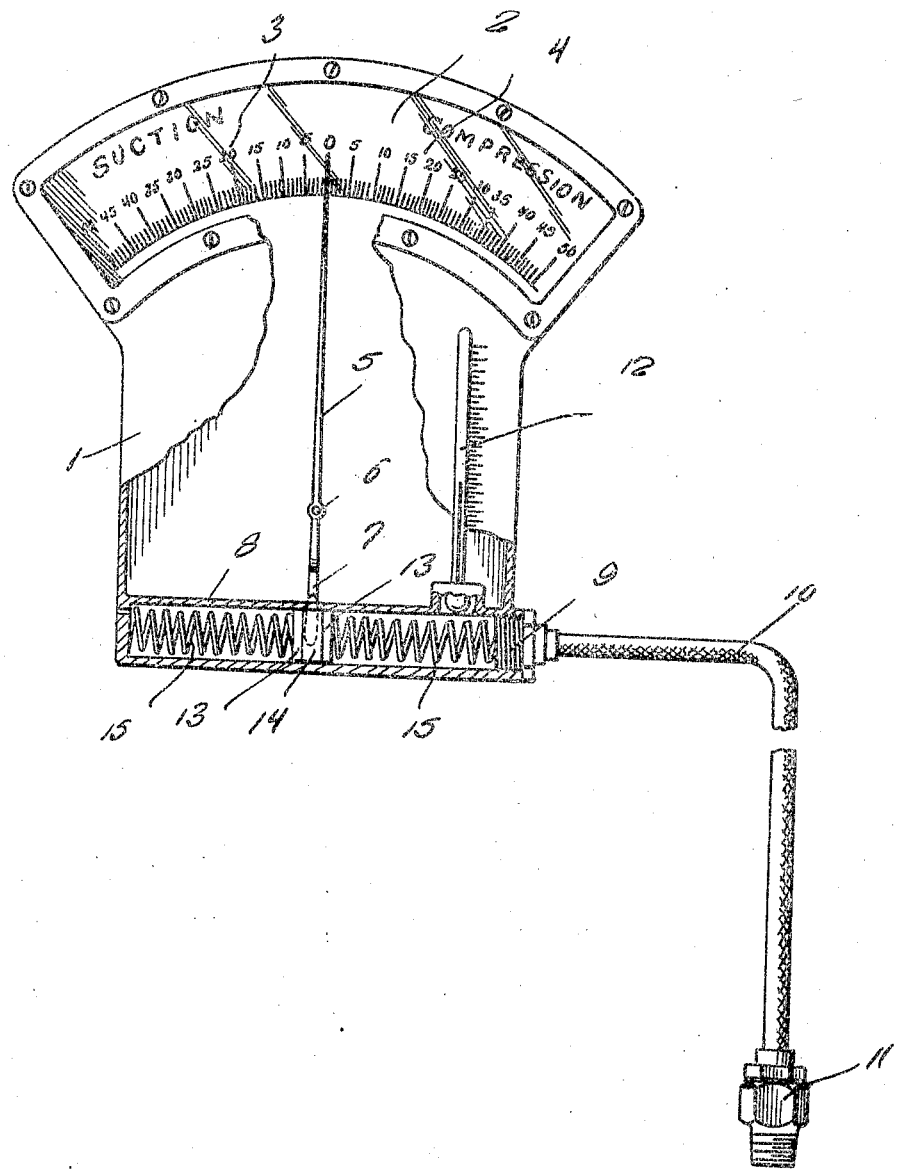
Inventor
J. J. Anderson,
By
Clarence O'Brien
Attorney Patented Aug. 3, 1926.

1,594,808

UNITED STATES PATENT OFFICE.

JUBAL JACKSON ANDERSON, OF HOMINY, OKLAHOMA, ASSIGNOR OF ONE-HALF TO E. E. CROOKS, OF HOMINY, OKLAHOMA.

ENGINE TESTER.

Application filed March 25, 1925. Serial No. 18,177.

This invention relates to an improved engine tester, the same having particular reference to a device of this kind which is more particularly adapted for use upon internal combustion engines of the type employed upon automobiles and other motor vehicles.

More specifically, the invention has reference to a testing device which may be utilized for accurately determining the degree of suction and compression of any desired cylinder.

Briefly, the invention comprises a cylinder in which a spring pressed member is reciprocable, this member being moved in one direction by the engine compression, and in the opposite direction under the influence of the engine suction. The member cooperates with a pointer which is pivotally mounted and in turn adapted to cooperate with an appropriate calibrated dial for indicating the degree of suction or compression.

One feature of the invention is the novel association of the cylinder with a casing provided with the calibrated dial, this casing constituting a mounting for a pivoted indicator.

Another feature of the invention is the centrally located member which is confined in said cylinder and held in a normal position by springs, the tension of which must be overcome by the compression and suction.

A further feature is the inclusion in the spring pressed member of a magnet which serves to operate the indicator by magnetism.

Other features and advantages of the invention will become apparent from the following description and drawing.

In the accompanying drawing forming a part of this application and in which like numerals are employed to designate like parts throughout the same:

The figure is a sectional and elevational view of a tester constructed in accordance with the present invention.

Referring to the drawings in detail, it will be seen that the reference character 1 designates an appropriately shaped casing provided with a curved top having a removable dial 2 of arcuate formation. This dial is provided on the left hand side with graduations or calibrations 3 indicating, by degrees, the engine suction. On the right hand half it is provided with similar graduations 4 for indicating the engine compression. An indicating finger 5 pivoted between its ends as at 6 upon the casing has its index end cooperable with these graduations. The pointer or indicator is capable of swinging in either direction. The lower end portion thereof is shaped to partially surround a horizontal cylinder 8 at the bottom of the casing. At the left hand end this cylinder is provided with a port and the opposite end thereof is opened for reception of a screw plug 9. Attached to this plug is a flexible hose 10 and swivelly connected to the free end of the hose is another plug 11 adapted to be tapped into a spark plug hole in the engine to be tested. Associated with the open end of the cylinder is a vertical thermometer 12 employed to indicate the temperature of the engine during the test.

It will be noted that the aforesaid reciprocable member is located at the center of the cylinder 8, the same being made up of a pair of leather packing discs 13 between which a permanent disc-shaped magnet 14 is located. Coiled springs 15 are located in the cylinder and bear at their inner ends against the discs 13 and at their outer ends against the plug 9 and end of the cylinder 8 respectively.

In practice, the plug 11 is tapped into the selected spark plug hole in the engine after removing the spark plug and assuming that it is desired to ascertain the degree of compression in that particular cylinder, the engine shaft is turned to bring the piston in that cylinder to the compression stage. Obviously, under the pressure produced in the cylinder, the member in the latter will be moved in a direction from right to left against the tension of the springs. Under the influence of the magnetism, the magnetized indicator will be rocked about its pivot to move its index over the graduations 4 to indicate the degree of compression. The suction in this particular cylinder may be ascertained by moving the piston to the suction forming position, thus moving the pointer in the opposite direction to cooperate with the graduations 3. The temperature is gaged by the thermometer 12.

From the foregoing description and drawing it will be seen that I have evolved and produced a novel testing device which will suffice to enable one to accurately ascertain the state of compression and suction in any selected cylinder of an internal combustion engine. It is thought that persons familiar with devices of this class will be able to obtain a clear understanding of the invention from the description and drawings. For this reason a more lengthy description is thought unnecessary.

While the preferred embodiment of the invention has been shown and described, it is to be understood that minor changes coming within the field of invention claimed may be resorted to if desired.

Having thus described the invention, what I claim is:—

1. In an engine testing device of the class described, a cylinder open at one end, a snug fitting member slidably mounted in said cylinder, a plug tapped into the open end of said cylinder, a flexible conduit connected to said plug, a coupling carried by the free end of said conduit, springs interposed between said plug, member, and cylinder for maintaining the member normally in a centrally located position, said member embodying a permanent magnet, a pivotally mounted indicator having a magnetized portion cooperable with said magnet, and a graduated dial with which the indicating end of the indicator is cooperable.

2. As a new article of manufacture, a portable accessory for testing internal combustion engine cylinder compression, and suction, valve defects and the like, comprising a casing provided at its bottom with a cylinder and at its top with a dial graduated for suction and compression indications, an indicator pivotally mounted in the casing and having its pointed end cooperable with the graduations, a member slidable in said cylinder and associated with the adjacent end of the indicator for operating the latter, springs arranged in said cylinder and bearing at their inner ends against said member, a flexible conduit connected with one end of the cylinder, and a coupling carried by the free end of the conduit, this coupling being adapted to be tapped into a spark plug opening in an engine cylinder.

In testimony whereof I affix my signature.

JUBAL JACKSON ANDERSON.